US011576011B2

(12) United States Patent
Zhang et al.

(10) Patent No.: US 11,576,011 B2
(45) Date of Patent: Feb. 7, 2023

(54) MULTICAST TRAFFIC TRANSMISSION METHOD, RELATED DEVICE AND COMPUTER-READABLE STORAGE MEDIUM

(71) Applicant: NANJIN ZHONGXINGXIN NEW SOFTWARE CO, LTD., Jiangsu (CN)

(72) Inventors: Zheng Zhang, Nanjing (CN); Yuehua Wei, Nanjing (CN); Min Xiao, Nanjing (CN)

(73) Assignee: NANJING ZTE NEW SOFTWARE CO., LTD., Nanjing (CN)

( * ) Notice: Subject to any disclaimer, the term of this patent is extended or adjusted under 35 U.S.C. 154(b) by 0 days.

(21) Appl. No.: 16/644,219

(22) PCT Filed: Sep. 4, 2018

(86) PCT No.: PCT/CN2018/103959
§ 371 (c)(1),
(2) Date: Apr. 16, 2020

(87) PCT Pub. No.: WO2019/042467
PCT Pub. Date: Mar. 7, 2019

(65) Prior Publication Data
US 2020/0245102 A1 Jul. 30, 2020

(30) Foreign Application Priority Data

Sep. 4, 2017 (CN) .......................... 201710785673.6

(51) Int. Cl.
*H04W 4/06* (2009.01)
*H04L 12/18* (2006.01)
(Continued)

(52) U.S. Cl.
CPC ............. *H04W 4/06* (2013.01); *H04L 12/189* (2013.01); *H04L 41/5009* (2013.01); *H04L 45/16* (2013.01)

(58) Field of Classification Search
None
See application file for complete search history.

(56) References Cited

U.S. PATENT DOCUMENTS 8,218,429 B2 7/2012 Wang et al.
9,036,466 B2 * 5/2015 Cirkovic ................. H04L 45/28
370/228

(Continued)

FOREIGN PATENT DOCUMENTS

CN 101004587 A 7/2007
CN 101035057 9/2007
(Continued)

OTHER PUBLICATIONS

International Search Report and Written Opinion Form PCT/ISA/210 and PCT/ISA237, International Application No. PCT/CN2018/1103959 pp. 1-6, International Filing Date Sep. 4, 2018, dated Nov. 21, 2018.

(Continued)

*Primary Examiner* — Kenny S Lin
(74) *Attorney, Agent, or Firm* — George McGuire

(57) ABSTRACT

A multicast traffic transmission method includes: detecting (S201) whether a transmission link between a designed forwarder (DF) and a traffic reception device is abnormal; and when the transmission link between the DF and the traffic reception device is abnormal, sending (S202) a first request to a backup designed forwarder (BDF). A packet of the first request includes a protection mark and address
(Continued)

information about the traffic reception device, and the first request is used for requesting the BDF to forward traffic to the traffic reception device.

13 Claims, 6 Drawing Sheets

(51) Int. Cl.
*H04L 41/5009* (2022.01)
*H04L 45/16* (2022.01)

(56) References Cited

U.S. PATENT DOCUMENTS

| | | | |
|---|---|---|---|
| 9,699,073 | B2 | 7/2017 | Kotalwar et al. |
| 2007/0168058 | A1* | 7/2007 | Kephart .............. G06F 11/2028 700/82 |
| 2011/0164508 | A1* | 7/2011 | Arai ................... H04L 45/60 370/245 |
| 2011/0280123 | A1* | 11/2011 | Wijnands ............. H04L 45/507 370/228 |
| 2013/0016606 | A1 | 1/2013 | Cirkovic et al. |
| 2014/0086041 | A1* | 3/2014 | Shah ................. H04L 45/48 370/218 |
| 2015/0172194 | A1* | 6/2015 | Song ................. H04L 45/66 370/235 |
| 2016/0036625 | A1* | 2/2016 | Hu .................. H04L 41/122 370/228 |
| 2016/0119255 | A1* | 4/2016 | Luo .................. H04L 41/0663 370/218 |
| 2016/0226701 | A1* | 8/2016 | Luo .................. H04L 41/022 |
| 2017/0244625 | A1* | 8/2017 | Meng ................ H04L 43/10 |
| 2017/0353382 | A1* | 12/2017 | Gupta ............... H04L 45/28 |

FOREIGN PATENT DOCUMENTS

| | | |
|---|---|---|
| CN | 101035057 A | 9/2007 |
| CN | 101110757 | 1/2008 |
| CN | 101127724 | 2/2008 |
| CN | 101420362 A | 4/2009 |
| CN | 101873260 A | 10/2010 |
| CN | 102316016 A | 1/2012 |
| CN | 103368712 | 10/2013 |
| CN | 106330699 A | 1/2017 |
| JP | 2010045732 | 2/2010 |
| JP | 2014209669 | 11/2014 |
| WO | 2014101124 A1 | 7/2014 |

OTHER PUBLICATIONS

Translated Japanese Office Action, dated Mar. 23, 2021. pp. 1-7.
Internet Engineering Task Force, Request for Comments Multicast-Only Fast Reroute, Aug. 2015 pp. 1-6.
Translated Chinese Office Action, pp. 107.
Translated CN Office Action, App. No. 201710785673.6, dated Jun. 6, 2022, pp. 1-8.
CN Office Action, App. No. 201710785673.6, dated Jun. 5, 2022, pp. 1-6.
CN Supplemental Search Report, dated May 30, 2022, pp. 1-2.
Translated CN Supplementary Search Report, dated May 30, 2022, pp. 1-1.

* cited by examiner

MULTICAST TRAFFIC TRANSMISSION METHOD, RELATED DEVICE AND COMPUTER-READABLE STORAGE MEDIUM

CROSS REFERENCE TO RELATED APPLICATIONS

This is a U.S. National Stage Application, filed under 35 U.S.C. 371, of International Patent Application No. PCT/CN2018/103959, filed on Sep. 4, 2018, which claims priority to Chinese patent application No. 201710785673.6 filed on Sep. 4, 2017, contents of both of which are incorporated herein by reference in their entireties.

TECHNICAL FIELD

The present disclosure relates to, but is not limited to, the field of communication technologies, and in particular relates to a multicast traffic transmission method and related device and a computer readable storage medium.

BACKGROUND

With the development of communication technologies, the multicast technology has been widely used in current Internet services. For example, the multicast technology can be applied to network conference, live broadcast of sports events or concerts, live broadcast teaching of network or medical operation and the like.

In the application of the multicast technology, two or more traffic forwarders are generally configured, and the traffic forwarders are configured to forward multicast traffic to a traffic reception device. In some cases, when a traffic transmission link between one of the traffic forwarders and the traffic reception device is abnormal, traffic reception by the traffic reception device is affected by the abnormal transmission link, so that the efficiency of receiving multicast traffic by the traffic reception device is low.

SUMMARY

Embodiments of the present disclosure provide a multicast traffic transmission method and related device and a computer-readable storage medium, which can avoid the situation of low efficiency of receiving multicast traffic by a traffic reception device when a traffic transmission link between one of the traffic forwarders and the traffic reception device is abnormal.

An embodiment of the present disclosure provides a multicast traffic transmission method. The method includes steps described below.

It is detected whether a transmission link between a designed forwarder (DF) and a traffic reception device is abnormal.

In response to determining that the transmission link between the DF and the traffic reception device is abnormal, a first request is sent to a backup designed forwarder (BDF), where a packet of the first request includes a protection mark and address information about the traffic reception device, and the first request is used for requesting the BDF to forward traffic to the traffic reception device.

An embodiment of the present disclosure further provides a multicast traffic transmission method. The method includes steps described below.

A first request sent by a request sending device is received, where a packet of the first request includes a protection mark and address information about a traffic reception device, and the first request is used for requesting a BDF to forward traffic to the traffic reception device.

The traffic is forwarded to the traffic reception device according to the first request.

An embodiment of the present disclosure further provides a multicast traffic transmission apparatus. The apparatus includes a first detection module and a sending module.

The first detection module is configured to detect whether a transmission link between a DF and a traffic reception device is abnormal.

The sending module is configured to: in response to determining that the transmission link between the DF and the traffic reception device is abnormal, send a first request to a BDF, where a packet of the first request includes a protection mark and address information about the traffic reception device, and the first request is used for requesting the BDF to forward traffic to the traffic reception device.

An embodiment of the present disclosure further provides a multicast traffic transmission apparatus. The apparatus includes a reception module and a forwarding module.

The reception module is configured to receive a first request sent by a request sending device, where a packet of the first request includes a protection mark and address information about a traffic reception device, and the first request is used for requesting a BDF to forward traffic to the traffic reception device.

The forwarding module is configured to forward the traffic to the traffic reception device according to the first request.

An embodiment of the present disclosure further provides a multicast traffic transmission device. The device includes a memory, a processor and a computer program stored on the memory and executable on the processor, where the computer program, when executed by the processor, implements the steps in the multicast traffic transmission method applied to a device sending a first request.

An embodiment of the present disclosure further provides a multicast traffic transmission device. The device includes a memory, a processor and a computer program stored on the memory and executable on the processor, where the computer program, when executed by the processor, implements the steps in the multicast traffic transmission method applied to a device receiving a first request.

An embodiment of the present disclosure further provides a computer-readable storage medium, which is configured to store a computer program which, when executed by a processor, implements the steps in the multicast traffic transmission method applied to a device sending a first request.

An embodiment of the present disclosure further provides a computer-readable storage medium, which is configured to store a computer program which, when executed by a processor, implements the steps in the multicast traffic transmission method applied to a device receiving a first request.

DETAILED DESCRIPTION

Embodiments of the present disclosure will be described hereinafter in conjunction with the drawings.

Figure 1:
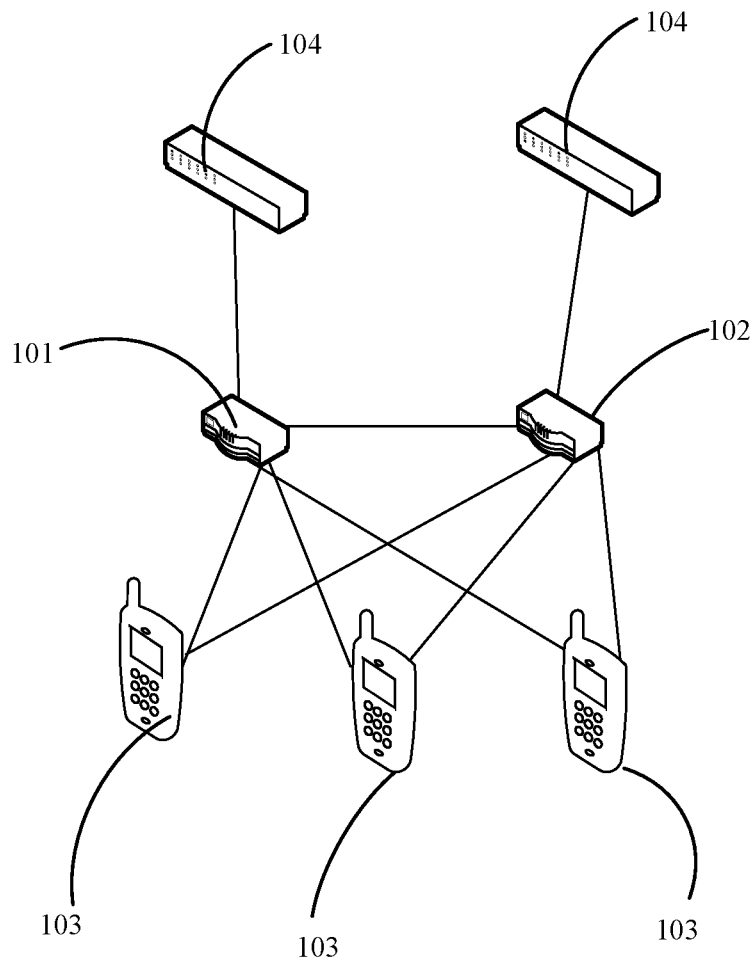
FIG. 1 is a diagram showing an application scenario according to an embodiment of the present disclosure.

As shown in FIG. 1, the embodiment of the present disclosure can be applied to a network involving at least two routers for forwarding traffic and several traffic reception devices which can accept traffic forwarded by the routers, where one of the routers can be determined as a designed forwarder, i.e., DF 101 and the other router can be determined as a backup designed forwarder, i.e., BDF 102 according to factors such as traffic characteristics and destination addresses. In addition, the DF 101 and the BDF 102 may be connected to different switches 104, respectively. Under the condition that the transmission link between the DF 101 and the traffic reception device 103 is normal, the DF 101 forwards multicast traffic to the traffic reception device 103, and when the transmission link is abnormal, the BDF 102 can be timely switched to for forwarding the multicast traffic to the traffic reception device 103. Through the above steps, traffic reception by the traffic reception device can be ensured not to be affected by the abnormal transmission link, and the efficiency of receiving the multicast traffic by the traffic reception device when the transmission link is abnormal is improved.

Figure 2:
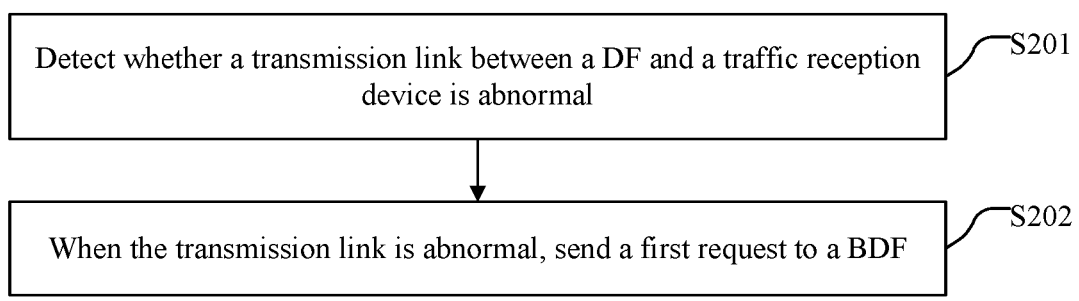
FIG. 2 is a flowchart of a multicast traffic transmission method according to an embodiment of the present disclosure.

As shown in FIG. 2, an embodiment of the present disclosure provides a multicast traffic transmission method. The method may include step S201 and step S202. In the step S201, it is detected whether a transmission link between a DF and a traffic reception device is abnormal. In the step S202, in response to determining that the transmission link between the DF and the traffic reception device is abnormal, a first request is sent to a BDF, where a packet of the first request includes a protection mark and address information about the traffic reception device, and the first request is used for requesting the BDF to forward traffic to the traffic reception device.

The method illustrated in the embodiment may be applied to a DF or a traffic reception device. When the method illustrated in the embodiment is applied to the DF, since there may be multiple traffic reception devices, when the method is applied to the DF, the DF may select to detect a transmission link between the DF and one of the traffic reception devices, and of course, may also select to detect multiple transmission links between the DF and different traffic reception devices. When a transmission link is detected to be abnormal, the first request is sent to the BDF, so that the BDF can proceed to forward the multicast traffic to the traffic reception device.

In addition, the method illustrated in the embodiment may be applied to the traffic reception device, and when the traffic reception device detects that the transmission link between the traffic reception device and the DF is abnormal, the first request can be sent to the BDF, so that the traffic reception device can continue to be receive the multicast traffic when the transmission link between the traffic reception device and the DF is abnormal. Optionally, after the first request is sent to the DF, the method may further include: receiving traffic forwarded by the BDF, where the traffic may be multicast traffic.

The distinction between a DF and a BDF may be determined by using a weight management mechanism. Optionally, when two or more traffic forwarders exist for forwarding multicast traffic, one may be used as the designed forwarder, i.e., the DF, and the other(s) as the backup designed forwarder, i.e. the BDF(s). Which traffic forwarder serves as the DF may be determined according to information such as characteristics of multicast traffic to be forwarded or the address of a target traffic reception device.

The multicast traffic forwarded by the DF and the BDF may be traffic of the network television. When multiple users watch the network television and transmission links are abnormal, the users may be caused to fail to watch the network television. Therefore, when the abnormal transmission links are timely found, and the BDF is timely notified to forward the multicast traffic, the users can be ensured to normally watch the network television.

Figure 3:
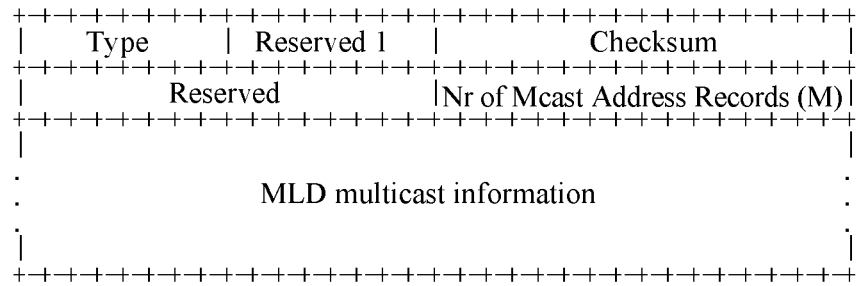
FIG. 3 is a schematic diagram of content of a packet of a first request according to an embodiment of the present disclosure.
Figure 4:
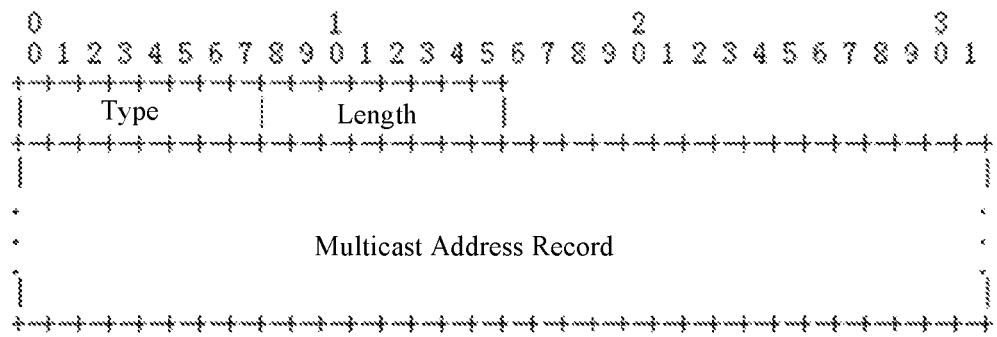
FIG. 4 is a schematic diagram of content of another packet of a first request according to an embodiment of the present disclosure.
Figure 5:
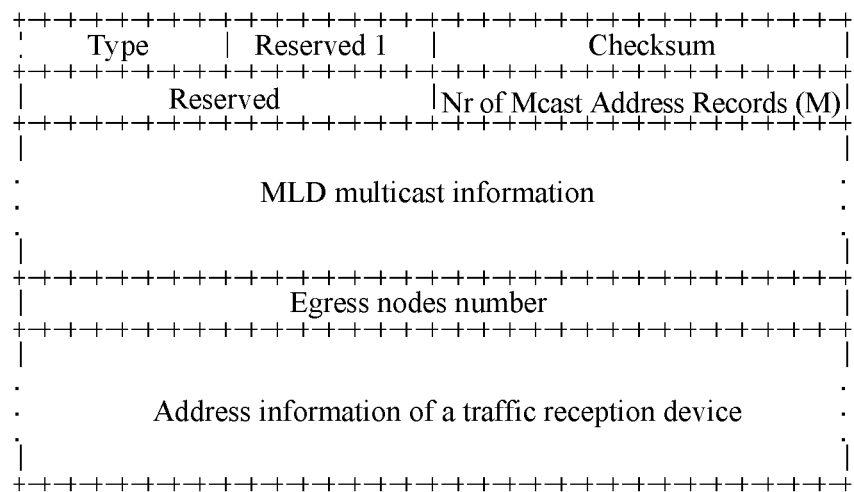
FIG. 5 is a schematic diagram of content of another packet of a first request according to an embodiment of the present disclosure.

Optionally, a type of the packet of the first request is a multicast listener discover (MLD) protocol, an Internet group management protocol (IGMP) or a border gateway protocol (BGP). FIG. 3 is a schematic diagram of content of a packet of a first request. For example, as shown in FIG. 3, when the type of the packet of the first request is the MLD protocol or the IGMP, the packet of the first request may include fields such as Type, Reserved, Reserved 1, Checksum, Nr of Mcast Address Records (M), and MLD multicast information. The protection mark may be the Reserved field or the Reserved 1 field. In addition, the Checksum field may be used for representing information about the sum of all correction verification codes. The Nr of Mcast Address Records (M) field may represent address information about all traffic reception devices, and the MLD multicast information field may represent information about the multicast technology. When the type of the packet of the first request is the BGP, the content of the packet of the first request may include Type (T), Length (L) and Value (V). Optionally, the content of the packet of the first request may include fields such as Type, Length or Value, where the field carrying Type may represent the protection mark, the Value field may carry information such as the logical address of a traffic reception device, and the Length field may represent information such as the length of the field of the protection mark. FIG. 4 is a schematic diagram of content of another packet of a first request. As shown in FIG. 4, a Type field may represent the protection mark, a Length field may represent information such as the length of the field of the protection mark, and a Multicast Address Record field in FIG. 4 has the same meaning as the Value field, that is, may include information such as the logical address of the traffic reception device. In addition, as shown in FIG. 5, compared with the content of the packet shown in FIG. 3, the packet of the first request may further include information such as Egress nodes number and address information about a traffic reception device, i.e., bit forwarding router-identity (BFR-ID), where the Egress nodes number field may represent number information about the traffic reception device which needs to receive the traffic after all the traffic reception devices in the network are numbered, while the address information about the traffic reception device, e.g., information about an Internet Protocol (IP) address of the traffic reception device may be represented by the BFR-ID.

Optionally and correspondingly, when the BDF forwards the multicast traffic to the traffic reception device, the header of the forwarded multicast traffic may include the address information about the BDF. The traffic reception device can thus clearly distinguish where the received multicast traffic is forwarded from. Of course, when the DF forwards the multicast traffic to the traffic reception device, the header of the forwarded multicast traffic may also include the address information about the DF. When the traffic reception device receives the multicast traffic forwarded by the BDF and the transmission link between the traffic reception device and the DF returns to normal, the traffic reception device simultaneously receives multicast traffic forwarded by the BDF and the DF, and the traffic reception device can determine which multicast traffic is forwarded by the BDF according to the address information in the header of the received multicast traffic and can choose to discard the multicast traffic forwarded by the DF, avoid accepting duplicate multicast traffic, where it is to be noted that the header of multicast traffic may be encapsulated by using the bit indexed explicit replication (BIER) technology.

In addition, when the traffic reception device receives the multicast traffic forwarded by the BDF and the transmission link between the traffic reception device and the DF returns to normal, the DF may also be switch to for continuing to forward the multicast traffic to the traffic reception device. Optional operations may include the following steps: the traffic reception device may send, in a multicast manner, a packet including a reset traffic protection mark to the BDF and the DF, and when the BDF receives the packet including the reset traffic protection mark, the BDF stops forwarding the multicast traffic to the traffic reception device and deletes the address information about the traffic reception device from the header of the multicast traffic. After receiving the packet including the reset traffic protection mark, the DF forwards the multicast traffic to the traffic reception device.

In the embodiment of the present disclosure, it is detected whether the transmission link between the DF and the traffic reception device is abnormal, and when the transmission link between the DF and the traffic reception device is detected to be abnormal, a first request is sent to the BDF. Through the above steps, when the transmission link between the DF and the traffic reception device is detected to be abnormal, the first request is sent to the BDF, so that the BDF forwards traffic to the traffic reception device. The method ensures that the traffic reception device can receive the traffic without being affected by the abnormal transmission link, and improves the efficiency of receiving the multicast traffic by the traffic reception device when the transmission link is abnormal.

Figure 6:
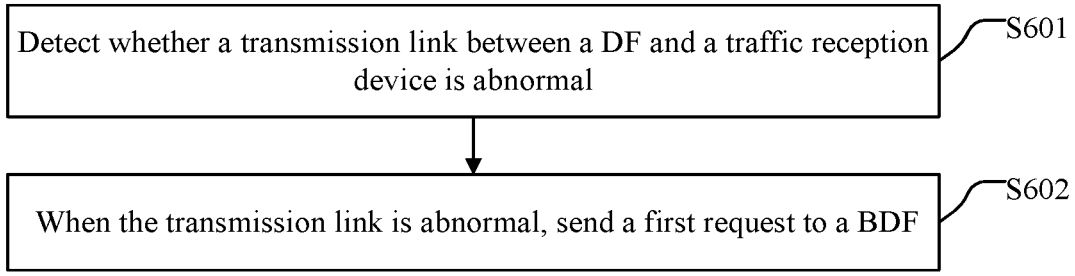
FIG. 6 is a flowchart of another multicast traffic transmission method according to an embodiment of the present disclosure.

As shown in FIG. 6, another multicast traffic transmission method is provided in an embodiment of the present disclosure, and the embodiment is different from the embodiment illustrated in FIG. 1 in how to detect whether a transmission link between a DF and a traffic reception device is abnormal. As shown in FIG. 6, the method may include steps S601 and S602. In step S601, it is detected whether the transmission link between the DF and the traffic reception device is abnormal. In step S602, when the transmission link between the DF and the traffic reception device is abnormal, a first request is sent to a BDF, where a packet of the first request includes a protection mark and address information about the traffic reception device, and the first request is used for requesting the BDF to forward traffic to the traffic reception device.

The method illustrated in the embodiment of the present disclosure can also be applied to the DF or the traffic reception device, and optionally, for the description, reference may be made to the embodiment illustrated in FIG. 2 and repetition is not be made herein.

Optionally, step S601 may include detecting whether the transmission link between the DF and the traffic reception device is abnormal through bidirectional forwarding detection (BFD).

Step S602 may include: when the transmission link between the DF and the traffic reception device is abnormal, sending the first request to a BDF which is not over a same shared network as the DF.

The DF and the traffic reception device can send packets to each other through the BFD, and the BFD determines whether the feedback message from the counter side can be received, so that the BFD determines whether the transmission link between the DF and the traffic reception device is abnormal. When both the DF and the traffic reception device can receive the feedback messages from each other, it can be indicated that the transmission link is normal, and when the feedback messages from each other cannot be received, it can be indicated that the transmission link is abnormal.

The BDF that is not over the same shared network as the DF may be a BDF that is not on the same switch as the DF, or may be a BDF that is not on the same server as the DF. Of course, the type of the shared network is not limited herein.

In the embodiment, whether the transmission link between the DF and the traffic reception device is abnormal is detected through the BFD, and thus the detecting result can be accurately and quickly obtained, and accordingly a corresponding response can be made according to the result, that is, when the transmission link is abnormal, a first request is sent to the BDF; when the transmission link is normal, no processing is done. Through the above steps, the accuracy of determining whether the transmission link between the DF and the traffic reception device is abnormal is improved.

Optionally, step S601 may include: detecting whether the traffic forwarded by the DF and received in a target time period reaches a preset value, where the preset value is a traffic value when the transmission link between the DF and the traffic reception device is normal; when the traffic forwarded by the DF and received in the target time period does not reach the preset value, determining that the transmission link between the DF and the traffic reception device is abnormal; and when the traffic forwarded by the DF and received in the target time period reaches the preset value, determining that the transmission link between the DF and the traffic reception device is normal.

The preset value may be set on the traffic reception device by a user or may be automatically acquired by the traffic reception device. It is to be noted that the value of the preset value and the value of the target time period are not limited herein.

In the embodiment, whether the traffic forwarded by the DF in the target time period reaches the preset value is detected for determining whether the transmission link between the DF and the traffic reception device is abnormal, so that the determination result is more intuitive and accurate, and the accuracy of determining whether the transmission link between the DF and the traffic reception device is abnormal is improved.

Optionally, before the first request is sent to the backup designed forwarder (BDF), the method further includes: detecting whether the DF needs a reboot or a software upgrade; and when the DF needs the reboot or the software upgrade, sending the first request to the BDF.

Whether the DF needs the reboot or the software upgrade is detected, and when it is determined that the DF needs the reboot or the software upgrade, the first request is sent to the BDF. When the transmission link is temporarily unavailable due to the fact that the DF needs the reboot or the software upgrade, the first request is sent to the BDF in time, so that the BDF forwards the traffic, and a reduction in the traffic reception efficiency of the traffic reception device due to a need of the reboot or software upgrade of the DF is avoided. Of course, when the DF needs the reboot or the software upgrade, the first request may be sent directly to the BDF, or in the case where it is not urgent for the traffic reception device to receive the traffic, the multicast traffic forwarded by the DF may not be received until the reboot or software upgrade of the DF is completed. In addition, the first request may be sent to the BDF when the DF needs the reboot or the software upgrade, or when the transmission link between the DF and the traffic reception device is abnormal, or when the DF needs the reboot or the software upgrade and the transmission link between the DF and the traffic reception device is abnormal.

In the embodiment, when it is determined that the DF needs the reboot or the software upgrade, the first request may be directly sent to the BDF, and a reduction in the traffic reception efficiency of the traffic reception device due to a need of the reboot or software upgrade of the DF is avoided.

In the embodiment of the present disclosure, it is detected whether the transmission link between the DF and the traffic reception device is abnormal, and when the transmission link between the DF and the traffic reception device is detected to be abnormal, a first request is sent to the BDF. Through the above steps, when the transmission link between the DF and the traffic reception device is detected to be abnormal, the first request is sent to the BDF, so that the BDF forwards traffic to the traffic reception device. The method ensures that the traffic reception device can receive the traffic without being affected by the abnormal transmission link, and improves the efficiency of receiving the multicast traffic by the traffic reception device when the transmission link is abnormal.

Figure 7:
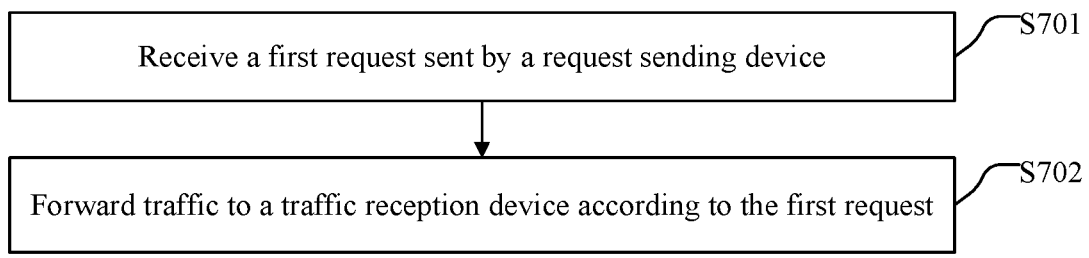
FIG. 7 is a flowchart of another multicast traffic transmission method according to an embodiment of the present disclosure.

As shown in FIG. 7, a multicast traffic transmission method is further provided in an embodiment of the present disclosure. The method may include steps S701 and S702. In step S701, a first request sent by a request sending device is received. A packet of the first request includes a protection mark and address information about a traffic reception device, and the first request is used for requesting a BDF to forward traffic to the traffic reception device. The request sending device and the BDF not being over the same shared network may be understood as that the request sending device and the BDF are not connected to the same switch. Also, it is possible that the requesting device and the BDF are not connected to the same router. In step S702, the traffic is forwarded to the traffic reception device according to the first request.

The method illustrated in the embodiment may be applied to the BDF, and the BDF is the backup designed forwarder that forwards multicast traffic. After receiving the first request, the BDF can forward traffic to the traffic reception device according to the address information about the traffic reception device included in the packet of the first request, where the traffic may be multicast traffic.

In the embodiment of the present disclosure, the first request is received and the traffic is forwarded to the traffic reception device according to the first request, so that the efficiency of traffic reception by the traffic reception device is ensured, and the traffic reception efficiency of the traffic reception device can be ensured not to be affected even when the transmission link between the traffic reception device and the DF is abnormal.

Optionally, the request sending device is the traffic reception device or the DF.

In the embodiment of the present disclosure, the request sending device may be the traffic reception device or the DF and can detect whether a transmission link between the traffic reception device and the DF is abnormal, which improves the probability of discovering an abnormal transmission link.

Figure 8:
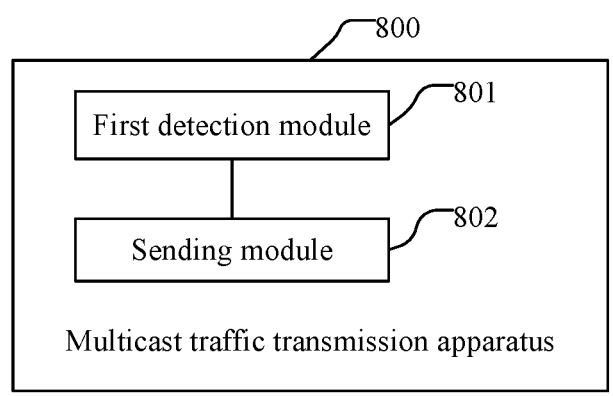
FIG. 8 is a structure diagram of another multicast traffic transmission apparatus according to an embodiment of the present disclosure.

As shown in FIG. 8, a multicast traffic transmission apparatus 800 is provided in an embodiment of the present disclosure. The apparatus 800 may include a first detection module 801 and a sending module 802. The first detection module 801 is configured to detect whether a transmission link between a DF and a traffic reception device is abnormal. The sending module 802 is configured to: when the transmission link between the DF and the traffic reception device is abnormal, send a first request to a BDF, where a packet of the first request includes a protection mark and address information about the traffic reception device, and the first request is used for requesting the BDF to forward traffic to the traffic reception device.

Optionally, the first detection module 801 is configured to detect whether the transmission link between the DF and the traffic reception device is abnormal through BFD; the sending module 802 is configured to: when the transmission link between the DF and the traffic reception device is abnormal, send the first request to a BDF which is not over a same shared network as the DF.

Figure 9:
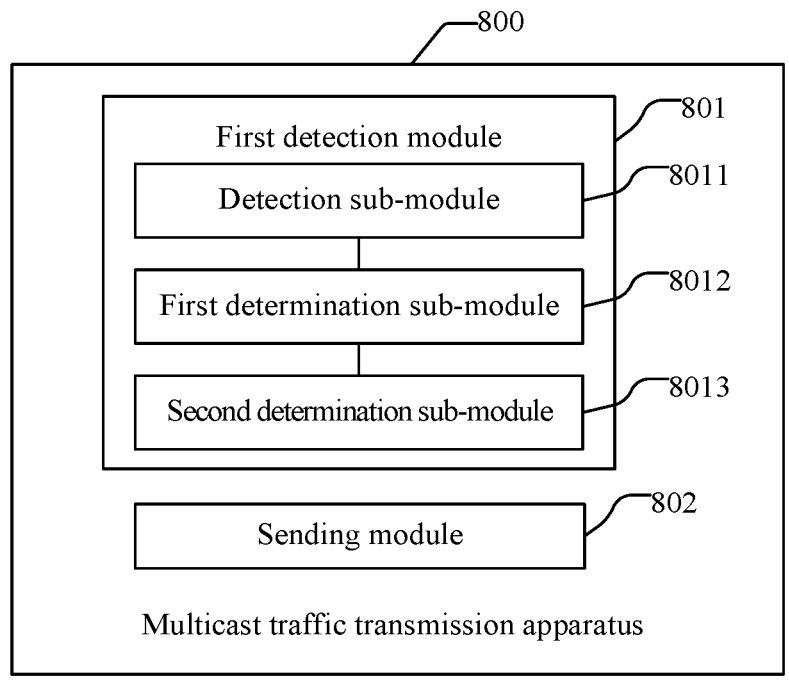
FIG. 9 is a structure diagram of another multicast traffic transmission apparatus according to an embodiment of the present disclosure.

Optionally, as shown in FIG. 9, the first detection module 801 includes a detection sub-module 8011, a first determination sub-module 8012 and a second determination sub-module 8013. The detection sub-module 8011 is configured to detect whether the traffic forwarded by the DF and received in a target time period reaches a preset value, where the preset value is a traffic value when the transmission link between the DF and the traffic reception device is normal. The first determination sub-module 8012 is configured to: when the traffic forwarded by the DF and received in the target time period does not reach the preset value, determine that the transmission link between the DF and the traffic reception device is abnormal. The second determination sub-module 8013 is configured to: when the traffic forwarded by the DF and received in the target time period reaches the preset value, determine that the transmission link between the DF and the traffic reception device is normal.

Figure 10:
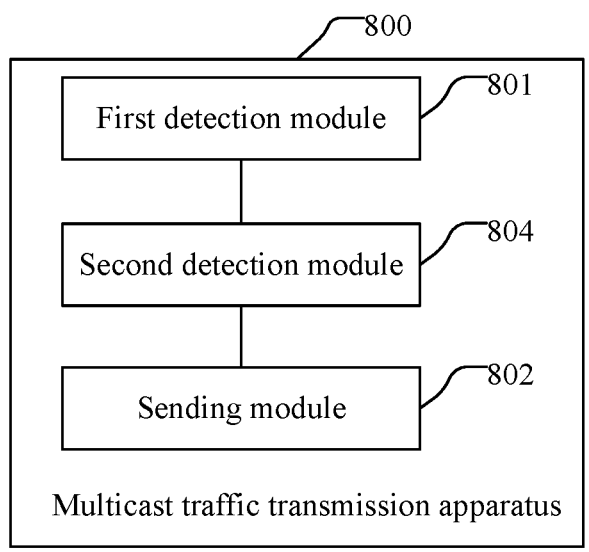
FIG. 10 is a structure diagram of another multicast traffic transmission apparatus according to an embodiment of the present disclosure.

Optionally, as shown in FIG. 10, the multicast traffic transmission apparatus 800 further includes a second detection module 804. The second detection module 804 is configured to detect whether the DF needs a reboot or a software upgrade. The sending module 802 is further configured to: when the DF needs the reboot or the software upgrade, send the first request to the BDF.

Optionally, a type of the packet of the first request is an MLD protocol, an IGMP or a BGP.

It is to be noted that the multicast traffic transmission apparatus 800 in the embodiment may be a multicast traffic transmission apparatus according to any implementation mode in the method embodiment illustrated in FIG. 2 or FIG. 6 in the embodiments of the present disclosure, and any implementation mode of the multicast traffic transmission apparatus according to the method embodiment illustrated in FIG. 2 or FIG. 6 in the embodiments of the present disclosure can be implemented by the multicast traffic transmission apparatus 800 in the embodiment and achieve the same beneficial effects. Repetition is not made herein.

Figure 11:
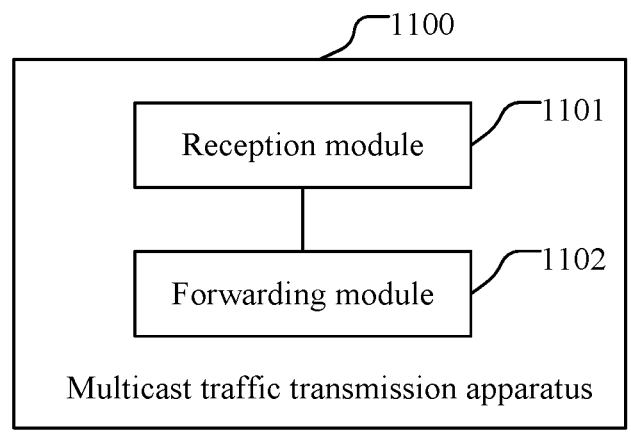
FIG. 11 is a structure diagram of another multicast traffic transmission apparatus according to an embodiment of the present disclosure.

As shown in FIG. 11, a multicast traffic transmission apparatus 1100 is further provided in an embodiment of the present disclosure. The apparatus 1100 may include a reception module 1101 and a forwarding module 1102. The reception module 1101 is configured to receive a first request sent by a request sending device, where a packet of the first request includes a protection mark and address information about a traffic reception device, and the first request is used for requesting a BDF to forward traffic to the traffic reception device. The forwarding module 1102 is configured to forward the traffic to the traffic reception device according to the first request.

Optionally, the request sending device is the traffic reception device or the DF.

It is to be noted that the multicast traffic transmission apparatus 1100 in the embodiment may be a multicast traffic transmission apparatus according to any implementation mode in the method embodiment illustrated in FIG. 7 in the embodiments of the present disclosure, and any implementation mode of the multicast traffic transmission apparatus according to the method embodiment illustrated in FIG. 7 in the embodiments of the present disclosure can be implemented by the multicast traffic transmission apparatus 1100 in the embodiment and achieve the same beneficial effects. Repetition is not made herein.

Figure 12:
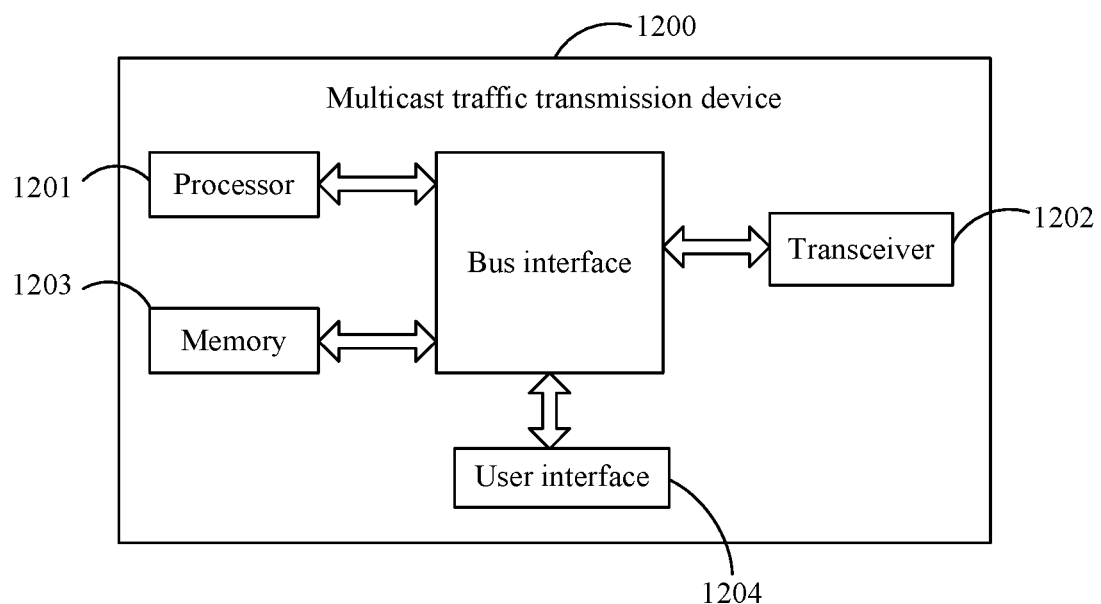
FIG. 12 is a structure diagram of a multicast traffic transmission device according to an embodiment of the present disclosure.

As shown in FIG. 12, FIG. 12 is a structure diagram of a multicast traffic transmission device according to an embodiment of the present disclosure, and details of the multicast traffic transmission method of the embodiment illustrated in FIG. 2 or FIG. 6 can also be implemented and the same effect can be achieved. As shown in FIG. 12, the multicast traffic transmission device 1200 may include: a processor 1201, a transceiver 1202, a memory 1203, a user interface 1204, and a bus interface. The processor 1201 is configured to read a program in the memory 1203 and perform the following steps: detecting whether a transmission link between a DF and a traffic reception device is abnormal; when detecting the transmission link between the DF and the traffic reception device is abnormal, sending a first request to a BDF, where a packet of the first request includes a protection mark and address information about the traffic reception device, and the first request is used for requesting the BDF to forward traffic to the traffic reception device.

The transceiver 1202 is configured to receive and send data under control of the processor 1201, and includes at least two antenna ports.

In FIG. 12, the bus architecture may include any numbers of interconnected buses and bridges, and may link together various circuits such as one or more processors represented by the processor 1201 and a memory represented by the memory 1203. The bus architecture may also link together various other circuits such as peripheral devices, voltage regulators, power management circuits, and the like, which is well known in the art and therefore are not described herein. The bus interface provides an interface. The transceiver 1202 may be a plurality of elements, including a sender and a receiver, and is configured as a unit to communicate with various other apparatuses over a transmission medium. For different user devices, the user interface 1204 may also be an interface capable of interfacing with a desired device, and the device to be connected includes, but is not limited to, a keypad, a display, a speaker, a microphone, a joystick, and the like.

The processor 1201 manages the bus architecture and general processing, and the memory 1203 may be configured to store data used by the processor 1201 when operations are performed.

Optionally, the step of detecting whether the transmission link between the DF and the traffic reception device is abnormal includes: detecting whether the transmission link between the DF and the traffic reception device is abnormal through a BFD.

The step of sending the first request to the BDF when the transmission link between the DF and the traffic reception device is abnormal may include: when the transmission link between the DF and the traffic reception device is abnormal, sending the first request to a BDF which is not over a same shared network as the DF.

Optionally, the step of detecting whether the transmission link between the DF and the traffic reception device is abnormal includes: detecting whether traffic forwarded by the DF and received in a target time period reaches a preset value, where the preset value is a traffic value when the transmission link between the DF and the traffic reception device is normal; when the traffic forwarded by the DF and received in the target time period does not reach the preset value, determining that the transmission link between the DF and the traffic reception device is abnormal; and when the traffic forwarded by the DF and received in the target time period reaches the preset value, determining that the transmission link between the DF and the traffic reception device is normal.

Optionally, before the first request is sent to the BDF, the method further includes: detecting whether the DF needs a reboot or a software upgrade; and when the DF needs the reboot or the software upgrade, sending the first request to the BDF. Optionally, a type of the packet of the first request is an MLD protocol, an IGMP or a BGP.

It is to be noted that in the embodiments of the present disclosure, the multicast traffic transmission device 1200 in the embodiment can implement the steps in the multicast traffic transmission method embodiment illustrated in FIG. 2 or FIG. 6 in the embodiments of the present disclosure and achieve the same beneficial effects, which will not be described in detail herein.

Figure 13:
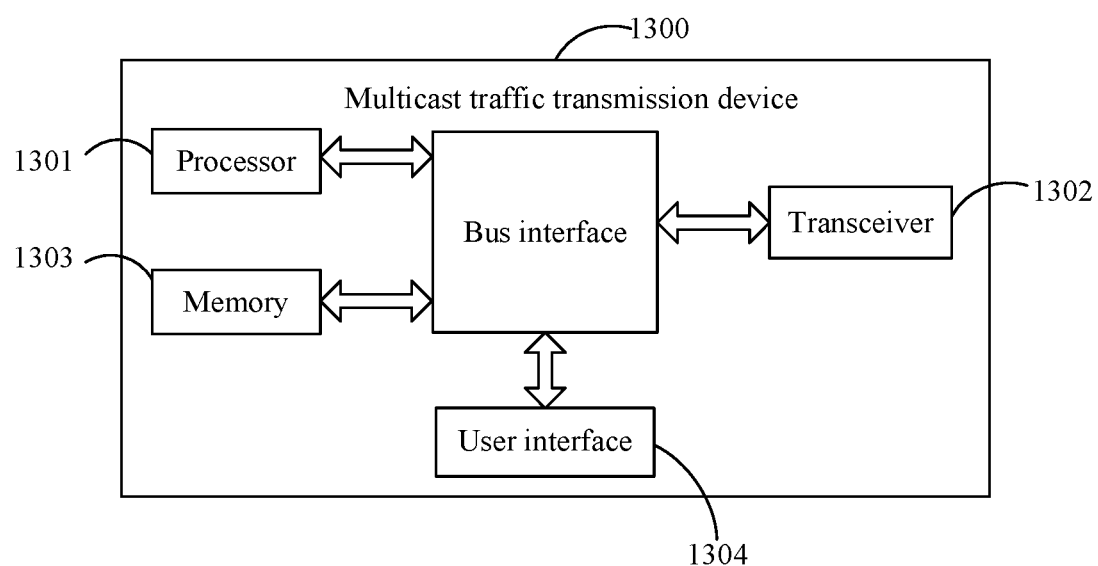
FIG. 13 is a structure diagram of another multicast traffic transmission device according to an embodiment of the present disclosure.

As shown in FIG. 13, FIG. 13 is a structure diagram of a multicast traffic transmission device according to an embodiment of the present disclosure, the multicast traffic transmission device can implement details of the multicast traffic transmission method of the embodiment illustrated in FIG. 7 and achieve the same effect. As shown in FIG. 13, the multicast traffic transmission device 1300 may include: a processor 1301, a transceiver 1302, a memory 1303, a user interface 1304, and a bus interface. The processor 1301 is configured to read a program in the memory 1303 and perform the following steps: receiving a first request sent by a request sending device, where a packet of the first request includes a protection mark and address information about a traffic reception device, and the first request is used for requesting a BDF to forward traffic to the traffic reception device; and forwarding the traffic to the traffic reception device according to the first request.

The transceiver 1302 is configured to receive and send data under control of the processor 1301, and includes at least two antenna ports.

In FIG. 13, the bus architecture may include any numbers of interconnected buses and bridges, and may link together various circuits such as one or more processors represented by the processor 1301 and a memory represented by the memory 1303. The bus architecture may also link together various other circuits such as peripheral devices, voltage regulators, power management circuits, and the like, which is well known in the art and therefore are not described herein. The bus interface provides an interface. The transceiver 1302 may be a plurality of elements, including a sender and a receiver, and is provided and configured as a unit to communicate with various other apparatuses over a transmission medium. For different user devices, the user interface 1304 may also be an interface capable of interfacing with a desired device, and the device to be connected includes, but is not limited to, a keypad, a display, a speaker, a microphone, a joystick, and the like.

The processor 1301 manages the bus architecture and general processing, and the memory 1303 may be configured to store data used by the processor 1301 when operations are performed.

Optionally, the request sending device is the traffic reception device or the DF.

It is to be noted that in the embodiments of the present disclosure, the multicast traffic transmission device 1300 in the embodiment can implement the steps in the multicast traffic transmission method embodiment illustrated in FIG. 7 in the embodiments of the present disclosure and achieve the same beneficial effects, which will not be described in detail herein.

A computer-readable medium is further provided in an embodiment of the present disclosure. It will be understood by those of ordinary skill in the art that all or part of the steps in the method embodiment illustrated in FIG. 2 or FIG. 6 may be implemented by related hardware instructed by programs, and these programs may be stored in a computer-readable medium. When the programs are executed, the following steps may be included: it is detected whether a transmission link between a DF and a traffic reception device is abnormal; and when the transmission link between the DF and the traffic reception device is abnormal, a first request is sent to a BDF, where a packet of the first request includes a protection mark and address information about the traffic reception device, and the first request is used for requesting the BDF to forward traffic to the traffic reception device.

Optionally, when the programs are executed, the step of detecting whether the transmission link between the DF and the traffic reception device is abnormal includes: detecting whether the transmission link between the DF and the traffic reception device is abnormal through BFD.

The step of sending the first request to the BDF when the transmission link between the DF and the traffic reception device is abnormal may include: when the transmission link between the DF and the traffic reception device is abnormal, sending the first request to a BDF which is not over a same shared network as the DF.

Optionally, when the programs are executed, the step of detecting whether the transmission link between the DF and the traffic reception device is abnormal includes: detecting whether traffic forwarded by the DF and received in a target time period reaches a preset value, where the preset value is a traffic value when the transmission link between the DF and the traffic reception device is normal; when the traffic forwarded by the DF and received in the target time period does not reach the preset value, determining that the transmission link between the DF and the traffic reception device is abnormal; and when the traffic forwarded by the DF and received in the target time period reaches the preset value, determining that the transmission link between the DF and the traffic reception device is normal.

Optionally, when the programs are executed, before the first request is sent to the BDF, the method further includes: detecting whether the DF needs a reboot or a software upgrade; and when the DF needs the reboot or the software upgrade, sending the first request to the BDF.

Optionally, when the programs are executed, a type of the packet of the first request is an MLD protocol, an IGMP or a BGP.

The computer-readable storage medium may be a read-only memory (ROM), a random access memory (RAM), a magnetic disk, an optical disk, or the like.

A computer-readable medium is further provided in an embodiment of the present disclosure. It will be understood by those of ordinary skill in the art that all or part of the steps in the method embodiment illustrated in FIG. 7 may be implemented by related hardware instructed by programs, and these programs may be stored in a computer-readable medium. When the programs are executed, the following steps may be included: a first request sent by a request sending device is received, where a packet of the first request includes a protection mark and address information about a traffic reception device, and the first request is used for requesting a BDF to forward traffic to the traffic reception device; and the traffic is forwarded to the traffic reception device according to the first request.

Optionally, when the programs are executed, the request sending device is the traffic reception device or the DF.

The computer-readable storage medium may be a read-only memory (ROM), a random access memory (RAM), a magnetic disk, an optical disk, or the like.

It will be understood by those of ordinary skill in the art that functional modules/units in all or part of the steps of the method, the system and the device disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be implemented jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those of ordinary skill in the art, the term, computer storage medium, includes volatile and nonvolatile, removable and non-removable media implemented in any method or technology for storing information (such as computer-readable instructions, data structures, program modules or other data). The computer-storage medium includes, but is not limited to, a random access memory (RAM), a read-only memory (ROM), an electrically erasable programmable read-only memory (EEPROM), a flash memory, or other memory technologies, a compact disc read-only memory (CD-ROM), a digital versatile disc (DVD) or another optical disc storage, a magnetic cassette, a magnetic tape, disk storage or another magnetic storage apparatus, or any other medium used to store the desired information and accessible by a computer. In addition, as is known to those of ordinary skill in the art, the communication medium generally includes computer-readable instructions, data structures, program modules or other data in modulated data signals such as carriers or other transmission mechanisms, and may include any information delivery medium.

It will be understood by those of ordinary skill in the art that the technical solutions of the present disclosure may be modified or substituted equivalently without departing from the spirit and scope of the technical solutions of the present disclosure and such modifications and equivalent substitutions should fall within the scope of the claims of the present disclosure.

What is claimed is:

1. A multicast traffic transmission method, comprising:
   detecting, by a designed forwarder (DF), whether a transmission link between the DF and each of a plurality of traffic reception devices is abnormal; and
   in response to determining that a transmission link between the DF and a first traffic reception device is abnormal, the DF stopping forwarding traffic to the first traffic reception device and sending, by the DF, a first request to a backup designed forwarder (BDF) which is not over a same shared network as the DF, wherein a packet of the first request comprises a protection mark and address information about the first traffic reception device, and the first request is used for requesting the BDF to forward traffic to the first traffic reception device, wherein the first traffic reception device is one of the plurality of traffic reception devices; and
   in response to determining that the transmission link between the DF and the first traffic reception device returns to normal, forwarding, by the DF, traffic to the first reception device so that the first traffic reception device simultaneously receives the traffic forwarded by the BDF and the traffic forwarded by the DF;
   wherein a header of the traffic forwarded by the DF comprises address information of the DF and a header of the traffic forwarded by the BDF comprises address information of the BDF.

2. The method of claim 1, wherein detecting, by the DF, whether the transmission link between the DF and each of the plurality of traffic reception devices is abnormal comprises:
   detecting, by the DF, whether the transmission link between the DF and each of the plurality of traffic reception devices is abnormal through bidirectional forwarding detection (BFD).

3. The method of claim 2, wherein before sending the first request to the BDF, the method further comprises:
   detecting, by the DF, whether the DF needs reboot or software upgrade; and
   in response to determining that the DF needs reboot or software upgrade, sending, by the DF, the first request to the BDF.

4. The method of claim 1, wherein detecting, by the DF, whether the transmission link between the DF and each of the plurality of traffic reception devices is abnormal comprises:
   detecting, by the DF, whether traffic forwarded to the first traffic reception device by the DF in a target time period reaches a preset value, wherein the preset value is a traffic value when the transmission link between the DF and the traffic reception device is normal;
   in response to determining that the traffic forwarded to the first traffic reception device by the DF in the target time period does not reach the preset value, determining, by the DF, that the transmission link between the DF and the first traffic reception device is abnormal; and
   in response to determining that the traffic forwarded to the traffic reception device by the DF in the target time period reaches the preset value, determining, by the DF, that the transmission link between the DF and the first traffic reception device is normal.

5. The method of claim 4, wherein before sending the first request to the BDF, the method further comprises:
   detecting, by the DF, whether the DF needs reboot or software upgrade; and
   in response to determining that the DF needs reboot or software upgrade, sending, by the DF, the first request to the BDF.

6. The method of claim 1, wherein before sending the first request to the BDF, the method further comprises:
   detecting, by the DF, whether the DF needs reboot or software upgrade; and in response to determining that the DF needs reboot or software upgrade, sending, by the DF, the first request to the BDF.

7. The method of claim 1, wherein a type of the packet of the first request is a multicast listener discover (MLD) protocol, an Internet group management protocol (IGMP) or a border gateway protocol (BGP).

8. A non-transitory computer-readable storage medium storing a computer program for implementing the steps in the multicast traffic transmission method of claim 1 when the program is executed by a processor.

9. A designed forwarder (DF), comprising a memory, a processor, and a computer program stored on the memory and executable on the processor, wherein the computer program, when executed by the processor, is configured to:
   detect whether a transmission link between the DF and each of a plurality of traffic reception devices is abnormal; and
   in response to determining that a transmission link between the DF and a first traffic reception device is abnormal, stop forwarding traffic to the first traffic reception device and send a first request to a backup designed forwarder (BDF) which is not over a same shared network as the DF, wherein a packet of the first request comprises a protection mark and address information about the first traffic reception device, and the first request is used for requesting the BDF to forward traffic to the first traffic reception device, wherein the first traffic reception device is one of the plurality of traffic reception devices;
   in response to determining that the transmission link between the DF and the first traffic reception device returns to normal, forward traffic to the first reception device;

wherein a header of the traffic forwarded by the DF comprises address information of the DF and a header of the traffic forwarded by the BDF comprises address information of the BDF.

10. The DF of claim 9, wherein the processor detects whether the transmission link between the DF and each of the plurality of traffic reception devices is abnormal by:
   detecting whether the transmission link between the DF and each of the plurality of traffic reception device is abnormal through bidirectional forwarding detection (BFD).

11. The DF of claim 9, wherein the processor detects whether the transmission link between the DF and the traffic reception device is abnormal comprises:
   detecting whether traffic forwarded to the traffic reception device by the DF in a target time period reaches a preset value, wherein the preset value is a traffic value when the transmission link between the DF and the first traffic reception device is normal;
   in response to determining that the traffic forwarded to the traffic reception device by the DF in the target time period does not reach the preset value, determining that the transmission link between the DF and the first traffic reception device is abnormal; and
   in response to determining that the traffic forwarded to the first traffic reception device by the DF in the target time period reaches the preset value, determining that the transmission link between the DF and the first traffic reception device is normal.

12. The DF of claim 9, wherein before sending the first request to the BDF, the processor is further configured to:
   detect whether the DF needs reboot or software upgrade; and in response to determining that the DF needs reboot or software upgrade, send the first request to the BDF.

13. The DF of claim 9, wherein a type of the packet of the first request is a multicast listener discover (MLD) protocol, an Internet group management protocol (IGMP) or a border gateway protocol (BGP).

* * * * *